Figure 1:
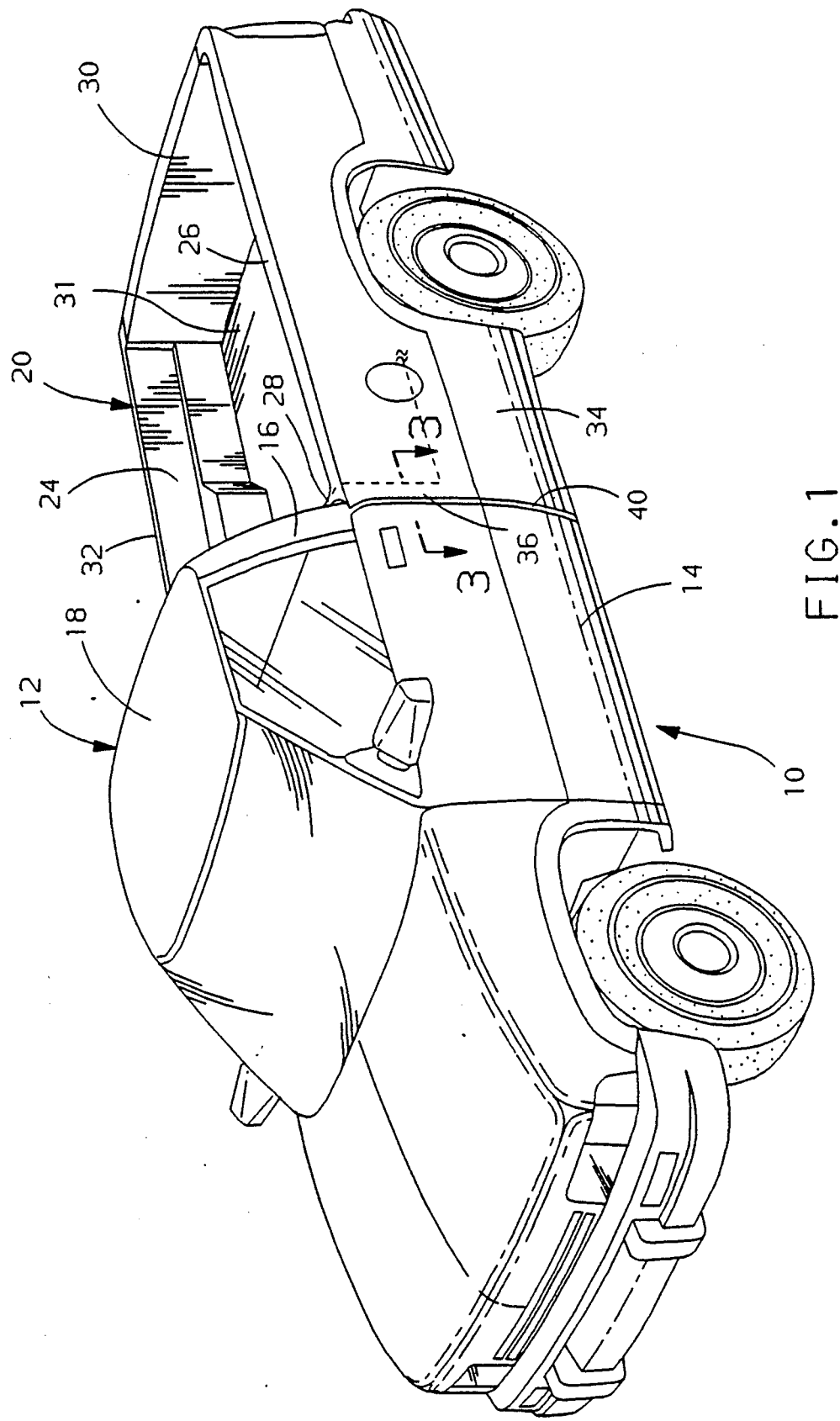

United States Patent [19]

Johnson et al.

[11] Patent Number: 4,998,769

[45] Date of Patent: Mar. 12, 1991

[54] CARGO BOX FOR TRUCK

[75] Inventors: Roger E. Johnson, Utica; Thomas C. Jensen, Clarkston; Edward C. VanRossen, Roseville; Kevin M. O'Donnell, Birmingham, all of Mich.

[73] Assignee: General Motors Corporation, Detroit, Mich.

[21] Appl. No.: 519,087

[22] Filed: May 4, 1990

[51] Int. Cl.$^5$ ............................................. B60R 27/00
[52] U.S. Cl. ...................... 296/183; 296/198
[58] Field of Search .................. 296/183, 198; D12/98

[56] References Cited

U.S. PATENT DOCUMENTS

| D. 163,544 | 6/1951 | Selzer | D12/98 |
|---|---|---|---|
| D. 177,773 | 5/1956 | Stier et al. | D12/98 |
| 2,007,295 | 7/1935 | Coble | 296/183 |
| 4,449,748 | 5/1984 | Fiala et al. | 296/183 |

FOREIGN PATENT DOCUMENTS 53572  3/1983  Japan ...................... 296/183

Primary Examiner—Margaret A. Focarino
Assistant Examiner—Gary C. Hoge
Attorney, Agent, or Firm—Edward J. Biskup

[57] ABSTRACT

A cargo box for a truck having side panels formed with wing section which extend forwardly in close proximity to the side portions of the cab to conceal the gap between the front of the cargo box and the rear of the cab. Each of the side panels are formed of a relatively flexible material so as to allow the wing sections to contact the cab without causing any damage when the truck frame is subjected to twisting while traversing rough terrain.

3 Claims, 2 Drawing Sheets

CARGO BOX FOR TRUCK

This invention concerns cargo boxes and more particularly a cargo box of the type that is mounted on the rear portion of the frame of a truck such as a pickup truck.

More specifically, the invention concerns a cargo box for a vehicle having a frame member the front end of which supports an operator's cab provided with a pair of doors on the opposed sides thereof with each door having a vertical rear section which engages a pillar portion of the cab. The cargo box, according to the present invention, includes a pair of laterally spaced side walls, a front wall and a back wall which can take the form of a pivotable tailgate. The ususal floor is provided for interconnecting the front, back and side walls and the cargo box is located on the frame so that a gap or space exists between the front wall of the cargo box and the rear of the cab. Each side wall has a fender connected thereto that has its front end formed with a wing section that extends forwardly from the side wall beyond the adjacent rear corner of the cab so as to prevent the space between the front wall and the rear of the cab from being visible when the vehicle is viewed from the side of the vehicle. In addition, the wing section can be made of a relatively flexible material so as to allow the cargo box to move relative to the cab without causing damages thereto when the frame twists during severe ride motions.

The objects of the present invention are to provide a new and improved cargo box for trucks that has side walls formed with forwardly projecting sections that extend beyond the rear corners of the truck cab; to provide a new and improved cargo box for a truck having outer side panels the forward ends of which extend beyond the rear corners of the cab and into close proximity with the rear vertical portion of the side doors of the cab so as to conceal the space between the front wall of the cargo box and the rear of the cab; and to provide a new and improved truck cargo body having side fender panels the front end of which extend forwardly in close proximity to the side portions of the cab and are formed from a relatively flexible material so as to allow the cargo body to move relative to the cab when the truck is subjected to torsional stresses.

Figure 2:
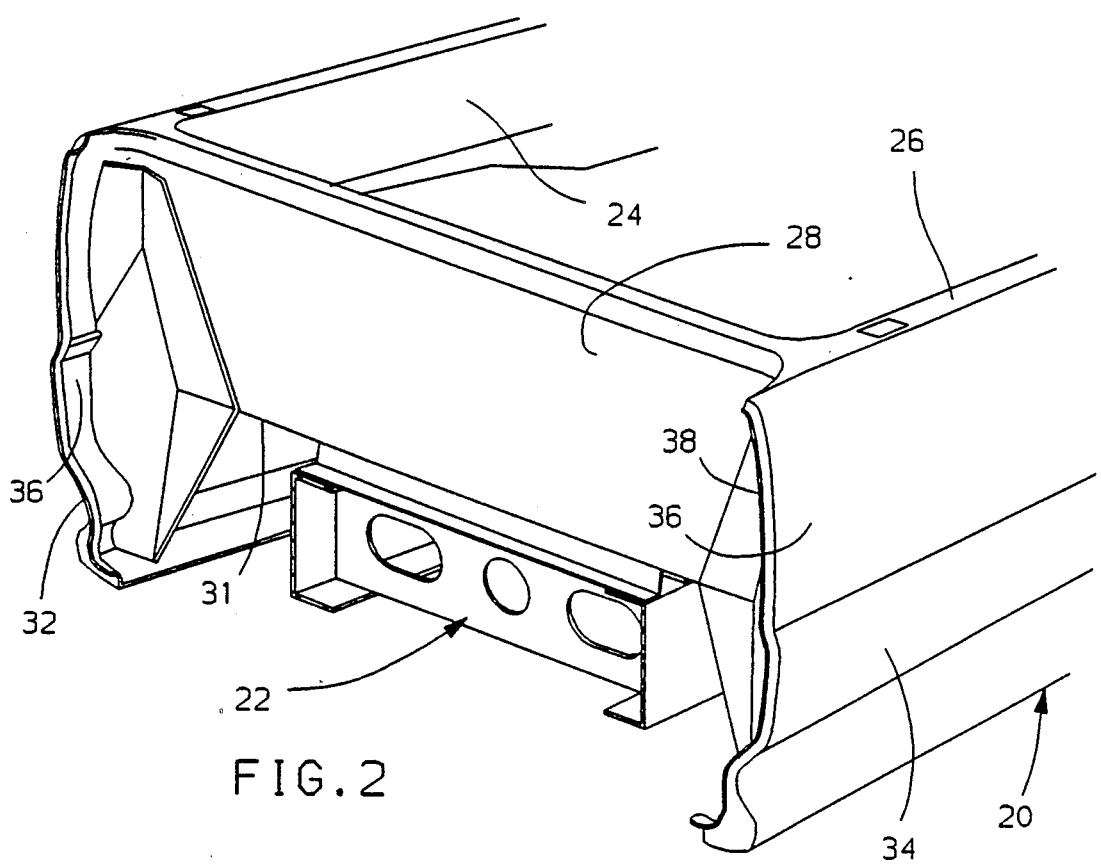
Figure 3:
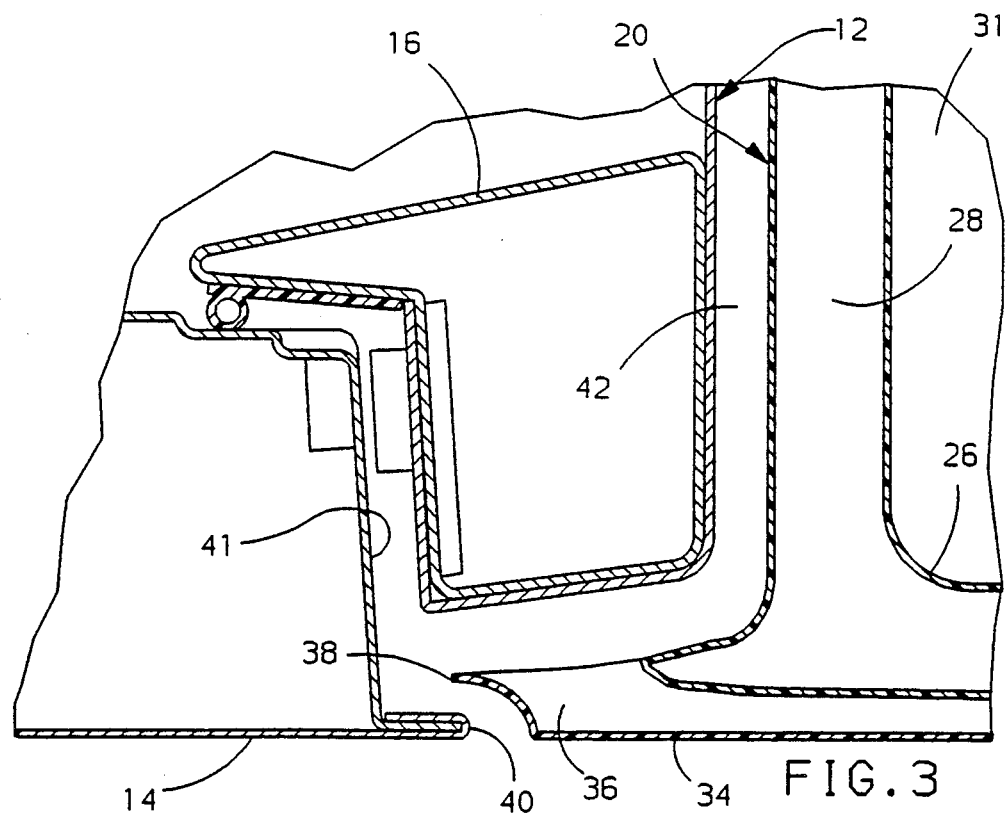

Other objects and advantages of the present invention will be more apparent from the following detailed description when taken with the drawings in which FIG. 1 is a perspective view of a pick-up truck incorporating a cargo box made in accordance with the present invention;

FIG. 2 is a partial perspective view of the front end of the cargo box in FIG. 1; and FIG. 3 is an enlarged sectional view taken on line 3—3 of FIG. 1.

Referring now to the drawings and more particularly FIG. 1 thereof, a pick-up truck 10 is shown that includes the ususal operator's cab 12 provided with a pair of side doors. The driver's side door can only be seen, and in this case is identified by the reference numeral 14. The cab 12 is formed with the usual laterally spaced rear B-pillars (only one of which is seen and is identified by reference numeral 16) located on the opposite rear corners of the cab 12. Each pillar 16 extends upwardly for rigid connection with the roof portion 18 of the cab. A cargo box 20, according to the present invention, is positioned to the rear of the cab 12 and together with the cab 12 is mounted on the vehicle chassis frame 22 as seen in FIG. 2.

More specifically, and as seen in FIGS. 1 and 2, the cargo box 20 includes a pair of laterally side walls 24 and 26, a front wall 28, and a back wall 30, which in this case, takes the form of a tailgate pivoted in the conventional manner at its lower end to a floor member 31 which is rigidly connected to the front wall 28 and the side walls 24 and 26. In the preferred form, the inner portion of the cargo box 20 is a one-piece composite achieved by molding fiberglass preforms around foam cores to provide localized stiffness and strength. Although not shown, the composite structure consists of cross sills, vertical beams and perimeter beams. Integral steel tapping plates can be molded into the beam section to provide for box to frame, tail light, and tailgate hardware mounting and stress distribution. Also, longitudinal beams can be molded into the floor member 31 to provide floor stiffness.

The respective side walls 24 and 26 have side fender panels 32 and 34 fastened thereto each of which is made of a relatively flexible material such as plastic. Each fender panel 32 and 34 has the front end thereof integrally formed with a wind section 36 that projects forwardly of the front wall of the cargo box 20 and, as seen in FIG. 3, extends beyond the adjacent rear pillar 16 of the cab 12 into close proximity with the side door 14 of the cab 12. The wing section 36 is of the same vertical dimension as the side door 14 and is styled so as to "blend in" with the design of the door 14. Thus, as seen in FIG. 3, the forward edge 38 of the wing section 36 is curved inwardly and is located adjacent and behind the rear vertical edge 40 of the side door and is uniformly spaced therefrom along its entire vertical length. As is conventional, the rear pillar section 41 of the side door 14 is intended to be releasably latched to the pillar 16 when the side door 14 is in the closed position as seen in FIGS. 1 and 3.

From the above description, it should be apparent that by having the wing sections 36 provided on the forward ends of the fender panels 32 and 34, the usual space or gap 42 located between the front wall 28 of the cargo box 20 and the rear of the cab 12 will be concealed when the vehicle is viewed from the side. In addition, by having the wing sections made from a relatively flexible material and located close to the body of the cab 12, relative twisting of the cab 12 and cargo box 20 when the truck is negotiating rough terrain will be allowed inasmuch as any contact between the two will not cause any damage to either member.

Various changes and modifications can be made in the construction of the cargo body without departing from the spirit of the invention. Such changes and modifications are contemplated by the inventors and they do not wish to be limited except by the scope of the appended claims.

The embodiments of the invention in which an exclusive property of privilege is claimed are defined as follows:

1. A cargo box for a vehicle having a front portion and a rear portion and a frame member supporting an operator's cab provided with a pair of laterally spaced side doors each of which has a rear vertical section which is releasably latch to a pillar portion of the cab, said cargo box comprising a pair of laterally spaced side walls, a front wall and a back wall, a floor joined to and rigidly interconnecting said front, side and back walls, said cargo box being positioned on said frame member so that a space exists between said front wall and the rear of said cab, and a wing section extending forwardly from each said side wall beyond a rear corner of said cab and into close proximity and coplanar with said rear vertical section of a said door so as to form a substantially uninterrupted surface between said front portion and said rear portion and to prevent said space between said front wall and the rear of said cab being visible when said vehicle is viewed from the side thereof.

2. A cargo box for a vehicle having a frame member supporting an operator's cab provided with a pair of laterally spaced side doors each of which has a rear vertical section which is releasably latched to a pillar portion of the cab, said cargo box comprising a pair of laterally spaced side walls, a front wall and a back wall, a floor joined to and rigidly interconnecting said front, side and back walls, said cargo box being positioned on said frame member so that a space exists between said front wall and the rear of said cab, and a pair of fender panels mounted on the respective side walls, each fender panel having a flexible wing section extending fowardly beyond the adjacent rear corner of said cab and into close proximity with said rear vertical section of said door so as to prevent said space between said front wall and the rear of said cab being visible when said vehicle is viewed from the side thereof.

3. A cargo box for a vehicle having a frame member supportinng an operator's cab provided with a pair of laterally spaced side doors each of which has a rear vertical section which is relasably latched to a pillar portion of the cab, said cargo box comprising a pair of laterally spaced side walls, a front wall and a back wall, a floor joined to and rigidly interconnecting said front, side and back walls, said cargo box being positioned on said frame member so that a space exists between said front wall and the rear of said cab, and each of said side walls having a fender mounted thereon made of flexible material, the front end of said fender being integrally formed with a wing section extending forwardly beyond the adjacent rear corner of said cab and into close proximity with said rear vertical section of said door so as to prevent said space between said front wall and the rear of said cab being visible when said vehicle is viewed from the side thereof.

* * * * *